W. E. MURRAY.
AUTOMATIC INDICATOR FOR VACUUM PANS.
APPLICATION FILED FEB. 12, 1917.
1,248,698.
Patented Dec. 4, 1917.
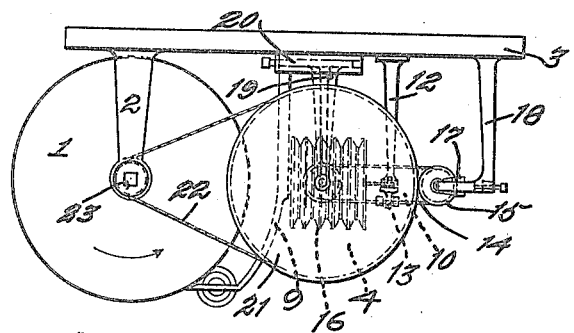
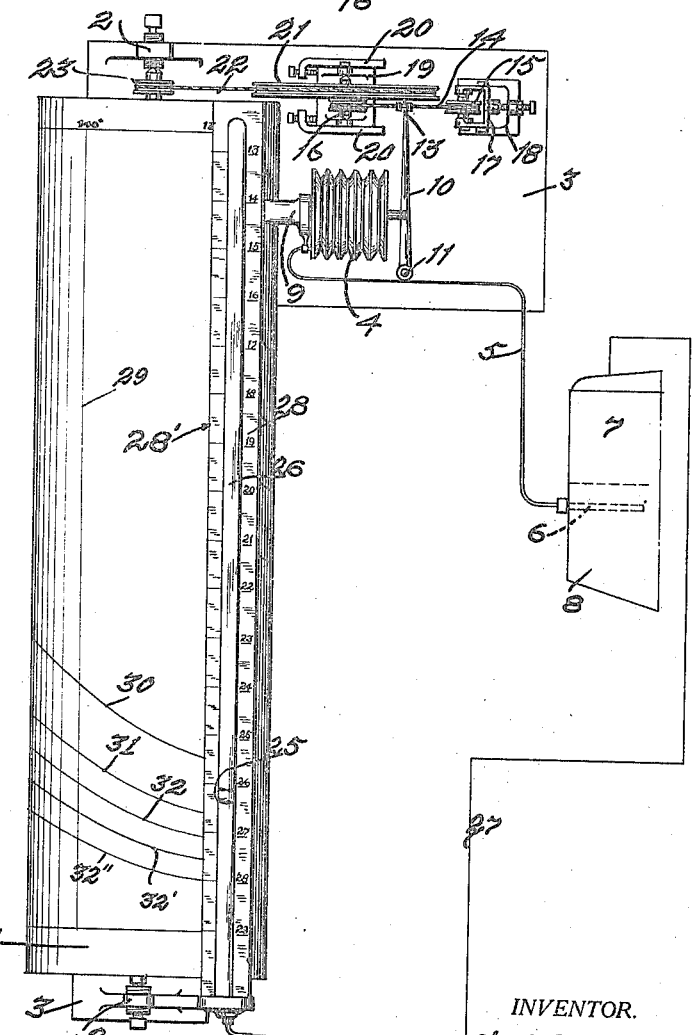

UNITED STATES PATENT OFFICE.

WARREN E. MURRAY, OF SAN FRANCISCO, CALIFORNIA, ASSIGNOR TO WESTERN SUGAR REFINING COMPANY, OF SAN FRANCISCO, CALIFORNIA, A CORPORATION OF CALIFORNIA.

AUTOMATIC INDICATOR FOR VACUUM-PANS.

1,248,698.  Specification of Letters Patent.  Patented Dec. 4, 1917.

Application filed February 12, 1917. Serial No. 148,263.

*To all whom it may concern:*

Be it known that I, WARREN E. MURRAY, a citizen of the United States, residing at the city and county of San Francisco and State of California, have invented certain new and useful Improvements in Automatic Indicators for Vacuum-Pans, of which the following is a specification.

The present invention relates to an automatic indicating device to be used in connection with vacuum pans as employed for the concentration and crystallization of sugar.

The object of the invention is to provide a device capable of indicating the degree of concentration, or super-saturation of the sugar solution within the vacuum pan, to enable the operator to control the temperature of the solution, and the vacuum within the pan, in such a manner as to secure the best possible results at all times, and as such constitutes an improvement on the device for which I am filing, coincidently herewith, application for United States Patent, under title of "Indicator for vacuum pans."

In the boiling and crystallization of sugar, the liquor, containing a considerable quantity of sugar in solution, but not enough to form a saturated solution, is introduced into the vacuum pan, and there heated, at a reduced pressure, to cause it to boil and thereby become more concentrated, until the proper degree of super-saturation is reached and crystals begin to form. These crystals, called seed grains, are at first exceedingly minute in size, and must be caused to grow, by the deposition upon them of additional crystalline sugar, until they attain the proper size. During this growth of the seed grains, great care must be exercised in the control of the temperature and pressure of the boiling solution, and in the admission of new liquor, for if the concentration of the boiling solution is allowed to fall below the saturation point, no more sugar crystallizes out, and a waste of heat and time ensues; and what is still more to be avoided, if the concentration of the solution rises above the point at which the crystals first appeared, the sugar, instead of depositing upon the seed grains, will come out as a new crop of exceedingly fine, or false-grain crystals. These false-grain crystals are objectionable, on account of their minute size, for they pass off with the syrups in the centrifugal machines, and then have to be melted and boiled again, thus resulting in a loss of time, fuel and capacity.

The temperature of the boiling solution depends, of course, upon the amount of sugar in solution, that is, the concentration, and the pressure within the pan. Therefore, the degree of concentration may be determined from the temperature and the pressure. The present invention comprises, broadly, a device for indicating the temperature of the boiling solution and the pressure within the pan, and for automatically causing these two factors to give an instantaneous indication of the concentration of the solution at all times. Now, if the saturation point and the degree of super-saturation at which the seed crystals first appeared are known, the concentration can easily be kept between these limits, by the proper control of the pressure and the admission of fresh, and relatively dilute liquor.

In order to more fully comprehend the invention, reference should be had to the accompanying drawings, wherein—

Figure 1 is an elevation of my automatic indicator, the vacuum pan and the connections therewith being indicated diagrammatically.

Fig. 2 is a plan view of my automatic indicator, certain parts being shown in phantom.

In the drawings, the reference numeral 1 designates a drum or cylinder, rotatably mounted in brackets 2 extending from a back-board or frame 3, the latter being vertically disposed in the form of the device herewith illustrated.

The numeral 4 designates the expansible chamber of a thermometer, whose interior is connected, by means of a tube 5, with a bulb 6, the latter being positioned within the vacuum pan 7, below the level of the liquid 8 therein. The vacuum pan 7 may be of any well known type, such, for example, as that commonly used for the evaporation and concentration of sugar. One end of the expansible chamber 4 is connected with a fixed bracket 9, and the other with a movable arm 10, pivotally mounted at 11 upon a bracket 12 extending from the back-board 3. Said arm 10 is connected, at its free end, as shown at 13, with an endless band 14, running over spaced pulleys 15 and 16. The pulley 15 is carried in a yoke 17, adjustably mounted upon a bracket 18. The pulley 16 is carried by a bracket 19, which is adjustable in guide supports 20. Said pulley 16 has fixed to it a larger pulley 21, and the latter is connected, by means of an endless band 22, with a pulley 23 carried upon the upper end of the shaft of the drum 1. Thus the drum 1 is rotated by the expansion and contraction of the chamber 4, the latter being caused by variations in the temperature of the liquid 8 within the pan.

Adjacent to the drum 1 is a pressure indicator, here shown as a mercury column 25 within a glass tube 26, said tube having its upper end closed, and being set parallel with the axis of the drum. The lower end of the tube 26 is connected, by means of a pipe 27, with the vacuum pan 7, so that the position of the mercury column 25 indicates the pressure within said pan. The tube 26 is provided with a suitable scale 28, preferably graduated in inches and fractions of inches, and marked to show, in inches of vacuum, the pressure within the pan 7. As here shown, this scale ranges from 13 to 29 inches of vacuum, such being the limits of the vacuum maintained within the pan.

The surface of the drum 1 is divided by longitudinally disposed lines, one of which is shown at 29, said lines indicating, when read with the edge 28' of the pressure indicator scale 28 as an index, the temperature of the solution 8 within the pan 7. The temperature of said solution, and the pressure within said pan, are thus simultaneously indicated, the former by the position of the drum 1, and the latter by the level of the mercury column 25.

The surface of the drum 1 is further provided with oblique lines or curves 30, 31, and 32, 32' and 32". The curve 30 represents the boiling point of water at different degrees of reduced pressure; that is, if the liquid in the pan 7 were pure water, the curve 30, at its intersection with the index 28', would follow the surface of the mercury column 25. The curve 31 similarly represents the boiling point of a saturated solution of sugar in water, and the curves 32, 32' and 32" represent the boiling points of supersaturated sugar solutions. These curves may either be calculated, and located upon the drum by means of the temperature lines 29 and the pressure scale 28, or they may be determined empirically.

It will readily be seen that the position of the mercury column 25 with respect to the curves 30, 31, 32, 32' and 32" gives an instantaneous indication of the concentration of the solution within the pan 7, assuming that said solution is boiling, by properly and automatically correlating the temperature and pressure thereof. Thus, if the top of the mercury 25 lies between the curves 30 and 31, as illustrated, the concentration of the solution must be below the saturation point; whereas if the mercury level is below said curve 31, the solution is super-saturated. The heat applied must, of course, be sufficient to boil the solution, in order to render the indications accurate.

The device is operated as follows: The liquor, containing sugar in solution, below the point of saturation, is drawn into the vacuum pan 7 and heated at a reduced pressure, by any well known means not shown in the drawings. As the boiling progresses, and the solution becomes more concentrated, its temperature increases, and the drum 1 revolves farther toward the right. When the mercury column 25 intersects the saturation curve 31, the operator knows that the solution is saturated, and begins to take samples thereof, in any well known manner. When these samples first show the appearance of crystals, the operator notes the degree of super-saturation, as expressed by the curve 32, 32' or 32" intersected by the mercury column 25 at the index 28'. At this point, also, the temperature begins to fall, owing to the decrease in concentration caused by the formation of crystals, thus giving an additional indication of the first appearance of crystals.

The boiling is then continued, the operator being careful to keep the concentration below the point at which crystals first appeared. For example, if crystals first appeared at the point of concentration expressed by the line 32", the operator thereafter keeps the concentration at a point, say, between the lines 32 and 32'. If the concentration falls below the point of saturation, sugar ceases to crystallize out, and the seed grains begin to re-dissolve; and if the concentration rises above the point at which crystals first appeared, a new crop of false-grain crystals appears; but by keeping the concentration between these limits the original seed crystals will be caused to grow, by the deposition thereupon of more sugar.

The control of the concentration is effected in the usual well known manner, by admitting fresh liquor to reduce the concentration, and by continued boiling to increase it. The vacuum is assumed to be constant in the foregoing description, but, since the final result shown upon the indicator includes any variations in this factor, such variations are easily compensated for in the control of the concentration.

When the seed grains have grown to the desired size, the process is stopped, the pan is emptied, and a fresh charge drawn thereinto in the usual manner.

I have herewith illustrated and herein described my invention in its preferred form, and for the sake of clearness I have gone into considerable particularity in said description and illustrations. It is to be understood, however, that the invention is not limited in this regard, but that changes, within the scope of the claims hereto appended, may be made in the device without departing from the spirit of the invention or sacrificing any of the advantages thereof. It is therefore my wish to be understood as claiming the invention as broadly as the state of the art will permit.

Having thus described my invention, what I claim as new and desire to protect by Letters Patent is:—

1. In combination with a vacuum boiling pan, means responsive to the temperature of the solution within said pan, means for determining the pressure within said pan, and means automatically controlled by said temperature responsive means and coöperating with pressure determining means to indicate the concentration of said solution.

2. In combination with a vacuum boiling pan, means responsive to the temperature of the solution within said pan, means for determining the pressure within said pan, and means controlled by one of said first two named means and controlled by the other for automatically indicating the concentration of said solution.

3. In combination with a vacuum boiling pan, a rotatable drum, devices responsive to the temperature of the solution within the pan for rotating said drum in accordance with changes in the temperature of said solution, and means associated with said drum for indicating the pressure within said pan, the surface of said drum being provided with indicia for determining a function of temperature and pressure.

4. In combination with a vacuum boiling pan, a rotatable drum, devices responsive to the temperature of the solution within the pan for rotating said drum in accordance with the changes in the temperature of said solution, and means associated with said drum for indicating the pressure within said pan and the surface of said drum being provided with markings for indicating the concentration of said solution.

5. In combination with a vacuum boiling pan, a rotatable drum having its surface divided circumferentially by spaced lines adapted to express degrees of temperature, and being provided with oblique lines adapted to measure solution concentration, devices responsive to the changes in temperature of the solution within the pan for rotating said drum in accordance with said changes, and means movable longitudinally with respect to said drum for indicating the pressure within said pan, said pressure indicating means co-acting with the oblique lines upon the surface of said drum to indicate the concentration of said solution.

6. In combination with a vacuum boiling pan, a rotatable drum having its surface divided by lines disposed parallel to its axis and adapted to express degrees of temperature, an expansible member connected with said drum and adapted to rotate the same by its expansion and contraction, means connecting said expansible chamber with said pan whereby changes in temperature of the solution within said pan will cause expansion or contraction of said chamber, a fluid containing tube associated with said drum and disposed parallel to the axis thereof, and a connection between said tube and said pan whereby the fluid in said tube is caused to move in accordance with variations in the pressure within said pan to indicate the concentration of the solution therein.

In testimony whereof I have signed my name to this specification in the presence of two subscribing witnesses.

WARREN E. MURRAY.

Witnesses:
N. A. ACKER,
D. B. RICHARDS.

Copies of this patent may be obtained for five cents each, by addressing the "Commissioner of Patents, Washington, D. C."